UNITED STATES PATENT OFFICE.

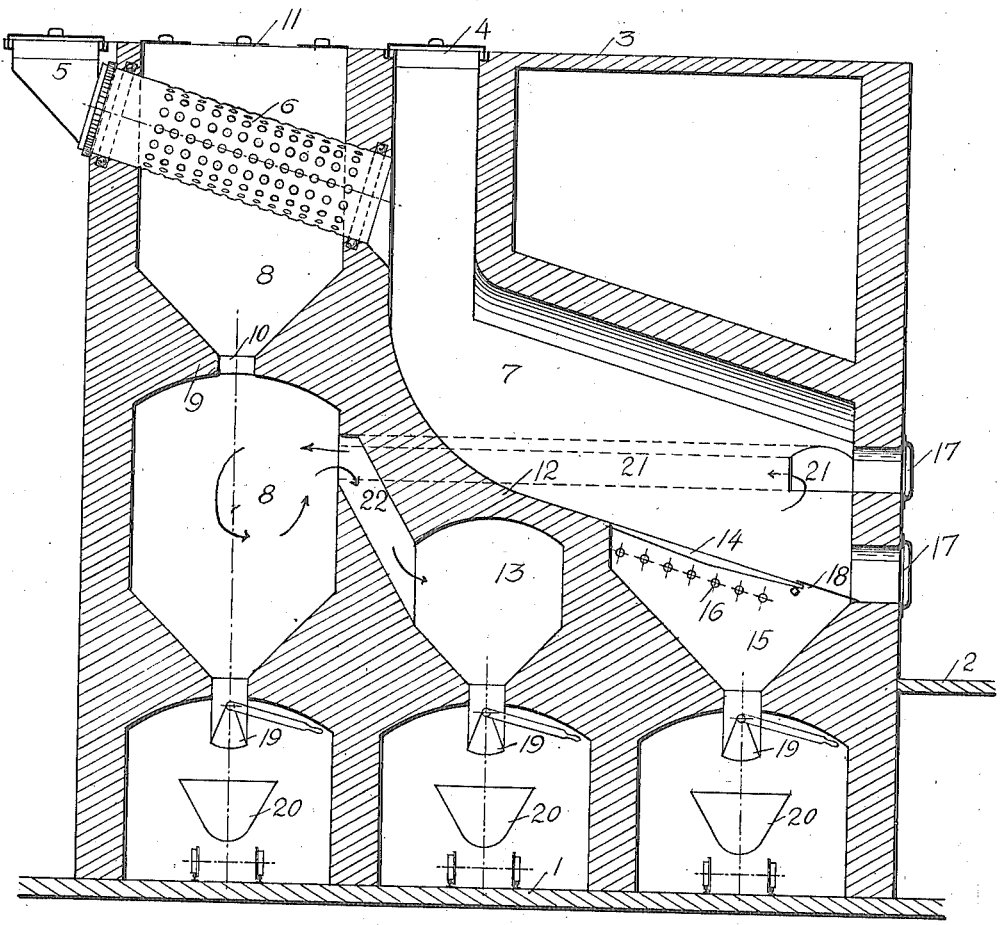

HEINRICH G. BEGEMANN, OF PERTH AMBOY, NEW JERSEY.

PROCESS OF TREATING REFUSE.

1,263,512.     Specification of Letters Patent.     Patented Apr. 23, 1918.

Application filed January 30, 1917. Serial No. 145,372.

*To all whom it may concern:*

Be it known that I, HEINRICH G. BEGEMANN, a subject of the German Emperor, residing at Perth Amboy, in the county of Union and State of New Jersey, have invented certain new and useful Improvements in Processes of Treating Refuse, of which the following is a specification.

The present invention relates to refuse destroyers and has for its object to provide a method of effectively treating refuse, including incineration of the same.

I have found that in refuse destructors of the hitherto known structure, the fine constituents of the refuse, such as fine ashes, street sweepings, etc., always render more or less difficult the destruction of the combustible matter, with which they are generally mixed. This fine incombustible matter also materially decreases the capacity of incinerators, if, either mixed with the general refuse, or separated it is charged into the same combustion chamber of the incinerator. It also materially increases the cost of incineration if the fine matter is separated from the coarse refuse and both are burned in separate and differently constructed furnaces.

The hereinafter described process entirely obviates the above mentioned disadvantages and consists in that the refuse is first separated and the fine constituents of the refuse are charged into any part of the incinerator, which is passed by the hot waste gases coming from the incinerating chamber, instead of charging the refuse into the incinerating chamber, while the coarser constituents are dumped into the latter. The part into which the fine parts of the refuse are charged may be situated anywhere between the incinerating chamber and the chimney.

To carry out my process I provide an apparatus which is illustrated in the accompanying drawing.

In the drawing the figure is a sectional diagrammatic view of the apparatus, similar reference characters therein denoting corresponding parts.

1 designates the discharging floor, 2 the stoking or clinkering floor and 3 the charging floor or top of the incinerator. The incinerator is provided with an opening 4, and a funnel 5 leading into a perforated rotary drum 6 arranged in an inwardly inclined position and opening into the incinerating chamber 7. 8 denotes the dust chamber which by a partition 9 is divided into two superposed compartments of which the upper one contains the drum 6. The two compartments are connected by a passage 10 made in the partition 9 and which is large enough to allow the passage of fine refuse from the upper compartment into the lower one and to allow the heat from the lower compartment to enter the upper compartment. Above the drum 6 the incinerator is provided with manholes 11 through which the perforations of the drum can be cleaned, if necessary.

Of course, instead of a rotary drum, any other suitable refuse feeding and sifting means may be employed. 12 denotes a fire-clay platform, on which the refuse coming from the drum will rest and on which it will still more highly be heated by the radiating heat of the dust chamber 8 and of the smoke flue 13 as well as by the waste heat produced by the incineration taking place on grate 14. 15 denotes the clinker chamber provided with small air holes 16. Characters 17 denote working doors and 19 valves leading into the discharge chambers in which cars 20 running on tracks are provided. 21 is a gas flue connecting the dust and incinerating chambers and 22 is a flue connecting the dust chamber with the smoke flue 13, which also is provided with means for removing the residue of flue dust and from which the gases pass to the boilers or the chimney.

My process is carried out in the following manner:

If there is only a small percentage of fine material in the refuse, the latter may be dumped directly into the incinerator through the opening 4 through which also large bodies, such as dead animals, boxes, mattresses, etc., may be inserted. If the refuse is mixed with large masses of ashes, sand, etc., it may be dumped into the funnel 5 leading into the drum 6. The rotation of the drum and its inclined position will cause the coarse particles or bodies of refuse to gradually drop into the incinerating chamber 7, while the fine particles will be sifted through the perforations of the drum into the dust chamber 8. The partition 9 will protect the steel drum 6 from the intense heat reigning in the lower compartment of the chamber 8, while the opening 10 will permit the fine particles of refuse to drop into the lower compartment and at the same time part of the heat of the lower compartment to be transmitted to the upper compartment, which, while not intense enough to destroy the drum 6, will serve to preheat and dry the refuse passing through the drum 6. The refuse falling from the drum 6 into the incinerating chamber 7 will first gather on the fire-clay platform 12 where it will be still more highly heated by the radiating heat of the dust chamber 8, smoke flue 13 and also the waste heat produced by the incineration on grate 14. The refuse is then raked from platform 12 onto the grate 14 on which it will be burned to ashes and clinkers. The combustion air for this process enters the clinker chamber 15 through the holes 16 before passing through the material on the grate.

As soon as one charge is completely burned, the doors 17 will be opened and the remaining clinkers will be removed from the grate through the space 18 into the clinker chamber 15. In the latter the clinkers will be cooled by the air of combustion before being discharged through the valve 19 into the cars 20.

The gases of combustion leave the incinerating chamber through the flue 21. The large area of the dust chamber will decrease the velocity of the gases considerably, thereby causing most of the flue dust to settle in the dust chamber 8. From the latter the gases will pass through the flue 22 into the smoke flue 13. The excess of air in the waste gases will burn all combustible matter that passes through the perforations of the drum 6. The fine incombustibles, however, will be sterilized by the intense heat before being discharged from the dust chamber.

It is obvious that this process of disposing of the fine constituents in the refuse, instead of either charging it into the general incinerating chamber or burning it in a special furnace, will materially increase the capacity of the incinerator, thereby decreasing operation expenses per ton of refuse.

This process is of still greater use, if a brick plant is connected with the incinerator in order to use the broken and ground clinkers for manufacturing so called "sand-lime bricks" for the reason, that sand and ashes remain loose in the dust chamber, while on the grate they would melt into clinkers, which would have to be ground up again.

What I claim and desire to secure by Letters Patent is:

1. A process of treating refuse, consisting in feeding the said refuse so that the fine particles will be directly charged into a zone situated beside the incinerating zone and the coarse particles will be directly charged into the incinerating zone, and causing the waste gases of the latter to pass through said first named zone.

2. A process of treating refuse, consisting in feeding the said refuse so that it will be separated into fine and coarse particles, causing said coarse constituents of the refuse to be charged directly into the incinerating zone and the fine constituents of the refuse into a zone outside of said incinerating zone, leading the waste gases from said incinerating zone through the said outer zone and causing the combustible matter of said fine particles to be burned and the noncombustible matter thereof to be sterilized.

3. A process of treating refuse, consisting in sifting the refuse so as to separate the fine and coarse particles of the latter and to deliver the coarse particles directly into the incinerating zone and the fine particles into a zone outside of said incinerating zone, leading the waste gases from said incinerating zone through said outer zone and causing the combustible matter of said fine particles in said outer zone to be burned and the noncombustible matter thereof to be sterilized.

4. A process of treating refuse which has been separated in fine and coarse particles, consisting in delivering the coarse constituents of the said refuse directly into the incinerating zone and the fine constituents thereof into a zone of comparatively great area and located outside of said incinerating zone, leading the combustion gases from said incinerating zone through said outer zone so as to burn the combustible matter of said fine particles and sterilize the non-combustible matter thereof.

In testimony whereof I affix my signature in presence of two witnesses.

HEINRICH G. BEGEMANN.

Witnesses:
 MAX D. ORDMANN,
 D. B. KLEIN.